United States Patent [19]

Pecate et al.

[11] Patent Number: 5,331,056
[45] Date of Patent: Jul. 19, 1994

[54] ELECTROCONDUCTIVE POLYMER COMPOSITIONS PRODUCED FROM POLYMERIZABLE AMPHIPHILIC HETEROCYCLES

[75] Inventors: Nicole Pecate, Montesson; Joël Richard, Chantilly, both of France

[73] Assignee: Rhone-Poulenc Films, Courbevoie, France

[21] Appl. No.: 992,758

[22] Filed: Dec. 18, 1992

[30] Foreign Application Priority Data

Dec. 18, 1991 [FR] France .............................. 91 16197

[51] Int. Cl.$^5$ .................. C08F 257/02; C08F 267/02; C08F 279/02; H01B 1/00
[52] U.S. Cl. .............................. 525/279; 525/284; 525/291; 252/500; 252/518
[58] Field of Search .............. 525/279, 284, 291; 252/500, 518

[56] References Cited

U.S. PATENT DOCUMENTS

| | | | |
|---|---|---|---|
| 4,604,427 | 8/1986 | Roberts et al. | |
| 4,871,680 | 10/1989 | Barraud et al. | 436/103 |
| 4,925,770 | 5/1990 | Ichimura et al. | 430/311 |
| 4,925,774 | 5/1990 | Barraud et al. | 430/296 |
| 5,024,873 | 6/1991 | Burack et al. | 525/436 |
| 5,196,257 | 3/1993 | Barraud et al. | 428/220 |

FOREIGN PATENT DOCUMENTS

| | | |
|---|---|---|
| 0253595 | 1/1988 | European Pat. Off. |
| 0332704 | 9/1989 | European Pat. Off. |
| 0348795 | 1/1990 | European Pat. Off. |

OTHER PUBLICATIONS

Database STN file CA, Chemical Abstracts, vol. 113, No. 14, Abstract No. 116755f (Mar. 1990).
Database STN file CA, Chemical Abstracts, vol. 112, No. 2 (1988), Abstract No. 7980j, Koenshu-Kyoto Daigaku Nippon Kagaku Sen 'i Kenkyusho, 45, pp. 43–48.
Synthetic Metals, vol. 15, Nos. 2, 3 (Jul./Aug. 1986), pp. 175–182; S. J. Jasne et al.: "Electrochemical Polymerisation of Pyrrole in the Presence of Latexes".

*Primary Examiner*—Vasu S. Jagannathan
*Attorney, Agent, or Firm*—Burns, Doane, Swecker & Mathis

[57] ABSTRACT

Polymer compositions, typically thermoplastic polymer compositions, readily converted into electroconductive polymers and articles shaped therefrom, e.g., films, comprise at least one convertible polymer support substrate (A) and at least one amphiphilic heterocyclic monomer (B) having the formula (I):

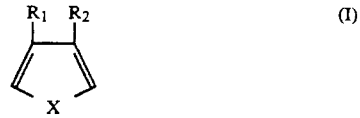

in which $R_1$ and $R_2$, which may be identical or different, are each a linear or branched alkyl, aryl, alkylaryl, arylalkyl, hydroxycarbonyl, alkoxycarbonyl or amide radical; X is an oxygen or sulfur atom or the divalent radical

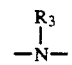

wherein $R_3$ is a hydrogen atom or an alkyl, aryl, alkylaryl or arylalkyl radical; at least one of the substituents $R_1$, $R_2$ and $R_3$ having an amphiphilicity-imparting number of carbon atoms.

25 Claims, No Drawings

5,331,056

ELECTROCONDUCTIVE POLYMER COMPOSITIONS PRODUCED FROM POLYMERIZABLE AMPHIPHILIC HETEROCYCLES

BACKGROUND OF THE INVENTION

1. Field of the Invention

The present invention relates to polymer compositions comprising amphiphilic compounds polymerizable into conductive polymers, and, more especially, to polymer particles having molecules of such amphiphilic compounds physically anchored into the surface layers thereof and to the production of electroconductive films therefrom.

2. Description of the Prior Art

It is known to this art to prepare conductive polymers comprising backbone chains of conjugated double bonds by anodic polymerization in the presence of conductive salts, or by chemical polymerization under the influence of oxidizing agents, of heterocyclic compounds containing two conjugated double bonds, such as pyrrole, thiophene or furan and the substituted derivatives thereof. Despite their value, the industrial development of these polymers has been slowed by various disadvantages such as a relative chemical instability, poor mechanical properties and, notably, processing difficulties inherent in their low solubility.

It has proven difficult to determine applications even for the most stable of such polymers, for example the polypyrroles. Various solutions to the problem of the processing of conductive polymers of this type have been reported. Thus, it has been described (cf. R. Yosomiya et al., *Makromol. Chem. Rapid. Comm.*, 7, 697-701 (1986)) to prepare composite electroconductive films by contacting pyrrole vapors with a preformed film of a film-forming polymer (polyvinyl alcohol, polyvinyl chloride, polymethyl methacrylate) containing an oxidizing agent (for example $CuCl_2$).

Published European Patent Application No. 0,206,414 and U.S. Pat. No. 4,521,450 describe polymerizing pyrrole via chemical route in liquid phase within a porous or absorbent solid such as paper or cellulosic materials, natural or synthetic fibers and thin plastic films (for example polyethylene or polypropylene).

Finally, the anodic or chemical polymerization has been described of monomers containing conjugated double bonds, especially pyrrole and the substituted derivatives thereof, in the presence of particles of convertible polymers containing ionic functional groups, serving as a dopant for the uncharged polymer by providing the counterion required to equilibrate the electrical charges of the conductive polymer; cf. published British Patent Application No. 2,124,635, U.S. Pat. No. 4,552,927, European Patent Applications Nos. 0,160,207 and 0,229,992, published French Patent Application No. 2,616,790, S. J. Jasne et al, *Synthetic Metals*, 15, 175-182 (1986). In a process of this type, the dopant polymer is generally dispersed in the polymerization mixture and, more particularly, the polymerization is carried out within a dopant polymer latex. Such a process proves particularly advantageous because it results in the formation of polymer particles comprising the dopant convertible polymer associated with the electroconductive polymer. Depending on the circumstances, the dispersions of these particles can be employed directly to produce electroconductive articles by coating and evaporation of the dispersion medium, or else the composite electroconductive particles can be isolated from the dispersion medium by conventional techniques and converted into finished or final shaped articles.

Whatever the process employed, it has been determined that the resulting electroconductive polymers lose a portion of their conductivity gradually over the course of time. This decrease is more or less slow, depending on the nature of the electroconductive polymer and depending on its conductivity level. In the case of polypyrrole, in particular, it has been noted that this decrease in conductivity is proportionately more rapid the higher the conductivity of the electroconductive polymer.

SUMMARY OF THE INVENTION

Accordingly, a major object of the present invention is the provision of especial compositions that avoid the drawback of instability over time of the electrical conductivity of those electroconductive polymers prepared by polymerization of a heterocyclic monomer comprising two conjugated ethylenic double bonds in the presence of a polymer.

Another object of the present invention is the provision of novel polymer compositions which can be employed to prepare easily convertible conductive polymers.

Still another object of this invention is the provision of partial aqueous or hydroorganic dispersions of polymer compositions which can be employed to prepare easily convertible electroconductive polymer compositions.

Still another object of this invention is the provision of particular process for preparing polymer compositions which can be employed to obtain conductive polymer compositions.

Yet another object of this invention is the provision of improved conductive polymer compositions.

Yet another object of this invention is the provision of aqueous or hydroorganic dispersions of such conductive polymer compositions.

Another object of the present invention is the provision of certain technique for converting such electroconductive polymer compositions into conductive coatings.

Briefly, the present invention features polymeric compositions comprising at least one convertible polymer (A) and at least one amphiphilic compound (B) having the general formula (I):

in which $R_1$ and $R_2$, which may be identical or different, are each a linear or branched alkyl, aryl, alkylaryl, arylalkyl, hydroxycarbonyl, alkoxycarbonyl or amide radical; X is an oxygen or sulfur atom or the divalent radical

wherein $R_3$ is a hydrogen atom or an alkyl, aryl, alkylaryl or arylalkyl radical; and at least one of the substituents $R_1$, $R_2$ and $R_3$ having a number of carbon atoms sufficient to impart amphiphilic properties to the compound of formula (I).

DETAILED DESCRIPTION OF THE PREFERRED EMBODIMENTS OF THE INVENTION

More particularly according to the present invention, in formula (I), $R_1$ and $R_2$ are advantageously alkyl radicals having from 1 to 30 carbon atoms, such as methyl, ethyl, propyl, pentyl, hexyl, 2-ethylhexyl, octyl, dodecyl, hexadecyl and octadecyl radicals, aryl radicals such as the phenyl radical, alkylaryl or arylalkyl radicals in which the alkyl moiety has from 1 to 30 carbon toms, such as methyl-, ethyl- and octadecylphenyl, benzyl, 2-phenylethyl and phenyldecyl radicals, alkoxycarbonyl radicals in which the alkoxy moiety has from 1 to 30 carbon atoms, such as methoxycarbonyl, ethoxycarbonyl, propoxycarbonyl, decyloxycarbonyl, dodecyloxycarbonyl, hexadecyloxycarbonyl and octadecyloxycarbonyl radicals, alkylamido groups in which the alkyl moiety has from 1 to 30 carbon atoms, such as methylamido, ethylamido, propylamido, 2-ethylhexylamido, stearylamido, octadecylamido, diethylamido, N-methyl-N-hexylamido, N-ethyl--N--octylamido, N--methyl--N--hexadecylamido and N-ethyl-N-octadecylamido radicals; $R_3$ is an alkyl radical having from 1 to 30 carbon atoms, such as those indicated above in respect of $R_1$ and $R_2$, and alkylaryl, arylalkyl and aryl radicals such as those indicated above in respect of $R_1$ and $R_2$.

The radicals $R_1$, $R_2$ and $R_3$ which impart an amphiphilic property to the molecule of heterocyclic compound of formula (I) are radicals containing a linear and/or cyclic hydrocarbon chain which has at least 10 carbon atoms, preferably ranging from 14 to 30 carbon atoms.

Exemplary amphiphilic compounds of formula (I) include N-octadecylpyrrole, N-dodecylpyrrole, N-hexadecylpyrrole, N-octadecyl-3,4-dimethylpyrrole, N-octadecyl-3-methyl-4-hydroxycarbonylpyrrole, 3-octadecyloxycarbonyl-4-methylpyrrole, 3-octadecyloxycarbonylpyrrole, 3-hexadecyl-4-methylpyrrole, 3-octadecylthiophene, 3-hexadecylthiophene, 3-octadecyl-4-methylthiophene, 3-octadecyloxycarbonylthiophene, 3-dodecylfuran and 3-hexadecylfuran.

Among the aforesaid compounds, those preferred are the amphiphilic substituted derivatives of pyrrole.

As the polymer constituting the "convertible" particles which can be employed as constituent (A) of the compositions according to the invention, any polymer is suitable which is readily convertible into finished products such as fibers, films, molded articles or coatings by the usual techniques for converting polymers, such as extrusion, blow extrusion, calendering, molding, coating, and the like. In this respect, many thermoplastic polymers are suitable, such as α-olefin polymers and copolymers (polyethylene, polypropylene, ethylene/propylene copolymers), polymers and copolymers of conjugated diolefins (polybutadiene, polyisoprene, butadiene/isoprene copolymers), polymers and copolymers of styrene and of α-methyl styrene with other mono- or polyethylenic monomers, such as polystyrene, styrene/butadiene and styrene/acrylonitrile copolymers, styrene/butadiene/acrylonitrile copolymers, styrene/butadiene/maleic acid copolymers, polymers and copolymers of vinyl esters: vinyl acetate and vinyl propionate, such as polyvinyl acetate, ethylene/vinyl acetate copolymers and their hydrolysis derivatives (ethylene/vinyl alcohol copolymers, ethylene/vinyl acetate/vinyl alcohol copolymer), acrylic (co)polymers: polyacrylonitrile, alkyl polyacrylates and polymethacrylates, polyacrylamides, polymethacrylamides, poly(N-methylolacrylamide), poly(N-methoxymethacrylamide), polymers and copolymers of dicarboxylic and ethylenic acids or anhydrides or their esters, such as fumaric, maleic or itaconic acids, polymers and copolymers of ethylenic halides, such as polyvinyl chloride, polyvinylidene chloride, polyvinylidene fluoride and the like. Preferred are thermoplastic polymers which are readily dispersible in water in the form of stable aqueous dispersions or latexes. Even more preferred are thermoplastic polymers such as those indicated above and containing in their backbone chains recurring units bearing anionic groups which serve as a dopant during the polymerization of monomers into conductive polymers. Those which are then particularly exemplary are: polymers derived from ethylenically unsaturated monomers containing carboxylic acid groups ((meth)acrylic acids, maleic acid, iraconic acid) or their alkali or alkaline earth metal or ammonium salts, polymers derived from ethylenically unsaturated monomers containing sulfonic groups or alkali, alkaline earth metal or ammonium sulfonates, such as vinylsulfonates, methallylsulfonates, vinylbenzenesulfonates, salts of 2-acrylamido-2-methylpropanesulfonic acid, of 2-sulfoethyl acrylate, and polymers derived from ethylenic monomers containing phosphonate groups, such as bis(2-chloroethyl) vinylphosphonates.

Exemplary polymers containing anionic groups which are very particularly suitable for the preparation of the polymer compositions according to the invention are copolyesters containing a plurality of structural units derived from diols and/or diacids bearing one or more sulfonic or sulfonate groups. Such copolyesters are described, especially, in French Patents Nos. 1,401,581 and 1,602,002, and in European Patent No. 0,129,674. It is also possible to use graft copolymers prepared by radical polymerization in aqueous phase of one or more acrylic monomer(s) optionally in combination with one or more vinyl monomer(s), in the presence of a copolyester containing a plurality of structural units derived from diols and/or diacids bearing one or more sulfonic or sulfonate groups, such as those described in the aforesaid patents or patent applications. Such graft copolymers are described in published European Patent Application No. 0,260,203, hereby expressly incorporated by reference.

The polymer compositions according to the invention can be prepared by any process that permits incorporating the amphiphilic compound (B) into the polymer (A). One process which is very particularly suitable for preparing these compositions entails adding the amphiphilic compound (B) to an aqueous or hydroorganic dispersion of particles of the convertible polymer (A). In this manner, polymer particles (A) are obtained comprising, impregnated into the surface layer thereof, molecules of the amphiphilic compound (B). In these particles, the hydrophobic chains of the compound (B) are intimately entangled with the chains of the polymer (A), and the hydrophilic and polymerizable moiety of the compound (B) is distributed at the face surfaces of said particles.

Consequently, the convertible polymers (A) indicated above are preferably processed in the form of stable dispersions, or latexes, in water or a hydroorganic medium. When the polymer does not contain any hydrophilic group which permits facilely obtaining a latex, it may be combined with one or more ionic or nonionic surface active agents such as those typically employed for producing aqueous dispersions and which are well known to this art. The polymer content of the latexes is not critical for obtaining the particles according to the invention, and can vary over wide limits. In general, latexes containing from 1% to 50% by weight of polymer are suitable; latexes containing from 5% to 30% by weight of polymer are the preferred. The size of the polymer particles constituting the latex is selected as a function of the application for which the final latex is ultimately intended; in general, the latexes employed are those in which the polymer particle diameter ranges from approximately 0.01 to 15 μm and preferably from 0.05 to 5 μm.

The polymer particles modified with the amphiphilic compounds of formula (I) can be obtained by addition, with stirring, of a solution of the amphiphilic compound (B) in an organic solvent to an aqueous or hydroorganic dispersion of the support polymer (A). The nature of the solvent is not critical and essentially depends on the nature of the amphiphilic compound, on that of the support or host polymer and of the medium containing same. Solutions of the amphiphilic compound in a water-miscible organic solvent are preferably employed. Thus, when the amphiphilic compound is a pyrrole derivative, a ketone having but few carbon atoms can be used, such as acetone and methyl ethyl ketone.

When the addition is completed, the solvent for the amphiphilic compound is removed by evaporation. In order to ensure a homogeneous mixture of the amphiphilic compound with the support polymer, the mixture may be heated to a temperature which depends on the nature of the polymer. In general, it is advantageous to conduct the addition of the amphiphilic compound at a temperature in the vicinity of the glass transition temperature of the polymer (A). When the solvent for the amphiphilic compound has a swelling effect on the support polymer, such heating may prove to be ineffective.

The respective amounts of polymer (A) and of amphiphilic compound (B) which are present in the compositions according to the invention can vary over wide limits. Thus, the amount of compound (B) may advantageously constitute from 0.1% to 20% by weight of the polymer (A), and preferably from 0.2% to 5%.

The compositions of the support or host polymer (A) and of the amphiphilic compound (B) can be isolated from the latex employing known techniques, for example by centrifuging.

The compositions of polymer (A) and of amphiphilic compound (B) are very particularly suitable for preparing conductive polymers which are easy to process into the form of various objects such as films, filaments, coatings and molded shaped articles. Thus, the present invention also features such conductive polymers and processes for the production thereof.

More particularly, the present invention also features convertible electroconductive polymeric compositions comprising at least one convertible polymer (A) and an electroconductive polymer (C) prepared from a monomer of the general formula:

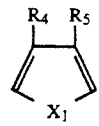

in which $R_4$ and $R_5$, which may be identical or different, are each a hydrogen atom or radicals which do not impart any amphiphilic property to the compound (C); $X_1$ is an oxygen atom, a sulfur atom or the divalent radical

wherein $R_6$ is a hydrogen atom or a radical which is identical to or different from $R_4$ and $R_5$ and incapable of imparting an amphiphilic property to the compound (C), said electroconductive polymer comprising structural units derived from at least one amphiphilic compound (B) of general formula (I).

More particularly, in the formula (II), $R_4$ and $R_5$ are each a hydrogen atom or alkyl radicals having from 1 to 4 carbon atoms, alkoxycarbonyl radicals having from 1 to 4 carbon atoms in the alkoxy moiety thereof, hydroxycarbonyl radicals, phenyl radicals, or alkylaryl or arylalkyl radicals in which the alkyl moiety has from 1 to 2 carbon atoms, and $R_6$ is a hydrogen atom or an alkyl radical having from 1 to 4 carbon atoms, a phenyl radical, or an alkylphenyl or phenylalkyl radical in which the alkyl moiety has from 1 to 2 carbon atoms.

Exemplary radicals $R_4$ and $R_5$ include methyl, ethyl, propyl, tolyl, xylyl, benzyl, 2-phenylethyl, methoxycarbonyl and ethoxycarbonyl radicals. Exemplary radicals $R_6$ include the methyl, ethyl, isopropyl, tolyl, xylyl or benzyl radicals.

Particularly exemplary of the compounds of formula (II) are pyrrole, 3-methylpyrrole, 3-ethylpyrrole, 3,4-dimethylpyrrole, 3-phenylpyrrole, 3-methoxycarbonyl-4-methylpyrrole, N-methylpyrrole, thiophene, 3-methylthiophene, 3-ethylthiophene, 3-methylfuran, 3-methoxycarbonylfuran and 3-ethoxycarbonylfuran.

The electroconductive polymer compositions according to the present invention can be prepared by polymerization of at least one monomer (C) of formula (II) in the presence of the polymer composition comprising the convertible polymer (A), and the amphiphilic compound (B), via known processes for polymerizing the monomers (C). In this regard, it is possible to carry out an anodic polymerization in aqueous phase, the composition including the convertible polymer (A) and the amphiphilic compound (B) then being dispersed in the aqueous phase of electrolysis- When the convertible polymer (A) cannot serve as a dopant, the anodic polymerization is conducted in the presence of an electrolyte, the anion of which is suited for stabilizing the polymer formed in its conductive state. Thus, electrolytes can be used such as those described in the *Encyclopedia of Polymer Science*, Vol. 13, pages 45 to 48 (for example sodium tetrafluoroborate, sodium hydrogensulfate or sodium perchlorate).

When compositions are employed in which the convertible polymer (A) can serve as a dopant because of its anionic character, it is not necessary to use any other doping agents. In all instances the anodic polymerization conditions are those typically employed (see, especially, European Application No. 0,160,207, hereby expressly incorporated by reference).

The conductive polymers of the invention can also be prepared in known manner by oxidizing chemical polymerization of one or more monomers (C) in the presence of the polymer composition comprising the polymer (A) and the amphiphilic compound (B), under the influence of the typical oxidizing agents. Exemplary thereof are inorganic peroxygen compounds such as the alkali metal and ammonium salts of peroxy acids (alkali metal perborates, percarbonates, perchromates and persulfates), perchloric acid and aqueous hydrogen peroxide, Lewis acids such as transition metal salts and especially halides or sulfates; it is thus possible to use ferric chloride or sulfate, titanium chloride or sulfate, cupric chloride and the like. When the polymer (A) does not contain any ionic groups capable of equilibrating the electrical charge of the conductive polymer and when the anion of the oxidizing compound cannot serve as a dopant, the oxidation is carried out in the presence of an anionic surface-active agent adopted to perform this function; it is thus possible, for example, to use alkali metal or ammonium sulfonates or sulfates (for example sodium dodecylbenzenesulfonate, sodium lauryl sulfate and sodium dioctyl sulfosuccinate).

In a first embodiment of the invention, chemical polymerization of the monomer(s) (C) may be carried out within a dispersion (or latex) of particles of the composition of polymer (A) and of amphiphilic compound (B) in a liquid medium, as described in European Patent Application No. 0,229,992 and in French Patent Application No. 2,615,790. The liquid dispersion medium for the composition comprising the convertible polymer (A) and the amphiphilic compound (B) may be water or a hydroorganic medium. The liquid dispersion medium is preferably selected such that it is a solvent for the monomer (C). Thus, if the monomer (C) is water-soluble, the dispersion medium for the composition (A)/(B) is preferably water. The conductive polymer according to the invention can be obtained simply by adding, with stirring, the monomer(s) (C) in solution in the dispersion liquid for the polymer composition (A)/(B) or in a solvent which is miscible with this liquid, followed by addition of the oxidizing compound. The temperature at which the polymerization is carried out generally ranges from 0° C. to 30° C., preferably from 5% to 25° C. The relative quantities of the various reactants used (essentially polymer composition (A)/(B), oxidizing agent and monomer(s) (C)) are a function of the amount of electroconductive polymer derived from (C) which is sought to be introduced into the final polymer, namely, of the desired electroconductivity for said polymer. In general, the amount of the monomer(s) (C) may constitute from 1% to 50% by weight of the convertible polymer (A). The molar ratio of oxidizing agent/monomer (C) is preferably close to the stoichiometric amount, although it is possible to deviate therefrom; thus, it is possible to employ from 0.9 to 2.5 times the stoichiometric amount of oxidizing agent. The dispersion of conductive polymer obtained at the end of polymerization can be employed as is, or else the particles of conductive polymer can be isolated from the dispersion medium by conventional techniques (for example centrifuging and filtration).

In a second embodiment of the invention, the conductive polymer composition can be provided by impregnation of the polymer composition (A)/(B) by means of an oxidizing agent, followed by contacting the impregnated composition with at least one monomer (C). In such a process, the composition (A)/(B) preferably is in the form of a shaped article, for example a film or a fiber. In another alternative of the invention, the polymer composition (A)/(B) is first contacted with the monomer (C) and then with the oxidizing agent. It is possible, for example, to contact a film of composition (A)/(B) with a vapor of monomer (C) and then to immerse the film impregnated with monomer (C) in a solution of oxidizing agent in a suitable solvent, maintained at an appropriate temperature. In general, the polymerization is conducted at a temperature ranging from 0° to 30° C. and preferably from 10° to 25° C. The concentration of the solution of oxidizing compound may vary over wide limits; thus, a solution containing from 0.1% to 20% by weight of oxidizing agent, and preferably from 0.5% to 10% by weight, is suitable. The temperature at which the polymer composition (A)/(B) is contacted with the vapors of monomer (C) may range from 5° to 70° C. and preferably from 15° to 35° C. The contact time between the composition (A)/(B) and the monomer (C) depends on the amount of conductive polymer which it is desired to deposit on the composition (A)/(B). In general, contact times of from 1 to 60 min are suitable. When the operation is conducted in accordance with this embodiment, shaped articles coated with a skin film of electroconductive polymer, for example of polypyrrole, are directly produced. In particular, it is possible to directly obtain films of polymer (A) which are coated at the surface thereof with a layer of conductive polymer which imparts antistatic properties thereto.

When the polymerization of the monomer(s) (C) is conducted within a dispersion of the polymer composition (A)/(B), a dispersion of particles of composition (A)/(B) which are coated with electroconductive polymer derived from the monomer(s) (C) is produced. Such dispersions, and especially the aqueous dispersions, can be employed for providing thermoplastic films bearing a coating of electroconductive polymer on at least one of the face surfaces thereof. Thermoplastic films which are exemplary are films of polyethylene, polypropylene, polyamides (for example polyamides 66), polyvinyl chloride, polyvinylidene chloride, cellulose derivatives, polyester and especially of polyalkylene terephthalates. The dispersion of conductive polymer can then be deposited onto the thermoplastic films by known coating techniques. In the event that the film is produced by drawing or multiple drawing of an amorphous extruded film, the coating may be carried out before any drawing or, if appropriate, between two successive drawings (in-line coating) or after the drawn film has been obtained (out-of-line coating). Before being coated with the electroconductive polymer, the thermoplastic film may be subjected to a treatment intended to improve its adherence to the electroconductive coating (for example a corona treatment) or may be coated with an adhesion primer of known type. Thus, the present invention also features thermoplastic films bearing a coating of electroconductive polymer.

In order to further illustrate the present invention and the advantages thereof, the following specific examples are given, it being understood that same are intended only as illustrative and in nowise limitative.

EXAMPLE 1

1. Preparation of a latex of styrene/butadiene copolymer particles comprising 3-octadecyloxycarbonyl-4-methylpyrrole molecules at the face surfaces thereof:

The following materials were charged into a 500-ml round bottom flask fitted with a stirring system, a heating device and a vacuum distillation column;

(i) 100 g of an aqueous latex of particles of styrene/butadiene/maleic acid copolymer having a solids content of 50% by weight; the copolymer had a glass transition temperature of 0° C. and the particles had a mean diameter of 0.4 μm. This latex is marketed under the trademark SB 023 ® by Rhone-Poulenc;

(ii) 100 g of distilled water, such as to provide a latex having a solids content of 25% by weight.

The contents of the flask were heated to 35° C. and a solution of 400 mg of 3-octadecyloxycarbonyl-4-methylpyrrole in 50 g of pure acetone was then slowly added thereto (over 10 min) with stirring. When the addition was completed, the contents of the flask were stirred at 35° C. for an additional 1 hour. The acetone was then evaporated off and the latex was then concentrated to a solids content of 40% by weight by distilling off water under reduced pressure without exceeding 40° C.

A sample of the latex was filtered off on a nylon cloth with a 5 μm mesh. The residue obtained was subjected to analysis by infrared spectrometry.

A latex of styrene/butadiene particles comprising, implanted at their surface, 0.8% by weight of 3-octadecyloxycarbonyl-4-methylpyrrole, relative to the solids content, was obtained in this manner.

2. Preparation of a conductive polymer

A film of the modified latex described above was cast with the aid of a film-spreader adjusted to obtain a thickness of 0.8 mm on a polyvinyl chloride (PVC) film 5 mm in thickness, 10 cm in width and 20 cm in length. The film and the PVC substrate were placed in an oven for 24 hours in order to evaporate the water therefrom. When the drying was completed the styrene/butadiene copolymer film was separated from the PVC substrate.

A 2 g sample of modified styrene/butadiene copolymer film was placed for 30 min in contact with pyrrole vapor maintained at 20° C. in a crystallizing dish. The pyrrole-impregnated film was then immersed for 3 min in an aqueous solution containing 1% by weight of ammonium persulfate, maintained at 20° C. The composite film thus obtained was rinsed with demineralized water and dried at 20° C. for 24 hours.

The surface conductivity of the film was determined by means of a Keithley 617 ® electrometer and of a Keithley 6105 ® cell comprising 3 electrodes. The composite film obtained had a surface conductivity of $3.6 \times 10^{-8}$ S.

By way of comparison, an electroconductive film was prepared by repeating the operating procedure described above, but after having replaced the styrene/butadiene copolymer modified with 3-octadecyloxycarbonyl-4-methylpyrrole with an unmodified styrene/butadiene copolymer. Under these conditions a film exhibiting a surface conductivity of $1.65 \times 10^{-13}$ S was obtained.

EXAMPLES 2 TO 5

A series of electroconductive films was prepared from, on the one hand, films of unmodified styrene/butadiene copolymer and, on the other, films of modified styrene/butadiene copolymer, employing the process described in Example 1, conducted under the same conditions with the exception of the temperature of impregnation of the film with pyrrole vapor, which was increased to 30° C., and of the impregnation period. After drying, films exhibiting the surface conductivities reported in the following Table I were obtained:

TABLE I

| EXAMPLES | Impregnation period (min) | Conductivity in S Modified polymer | Conductivity in S Unmodified polymer |
|---|---|---|---|
| 2 | 5 | $5.5 \times 10^{-8}$ | $1.5 \times 10^{-11}$ |
| 3 | 10 | $3.7 \times 10^{-7}$ | $1.7 \times 10^{-8}$ |
| 4 | 15 | $4.7 \times 10^{-7}$ | $4.1 \times 10^{-9}$ |
| 5 | 25 | $5.5 \times 10^{-5}$ | $3.89 \times 10^{-7}$ |

It was determined that the conductivity of the styrene/butadiene copolymer film modified with the amphiphilic pyrrole increased more rapidly than that of the unmodified styrene/butadiene copolymer film.

EXAMPLE 6

An electroconductive film which exhibited a surface conductivity of $3.6 \times 10^{-8}$ S was prepared by repeating the procedure Example 1. The change in the conductivity of this film over time was monitored by measuring its conductivity after 1 day, 2 days, 8 and 16 days of storage at 25° C. in a vessel in which the atmosphere had a relative humidity (RH) of 40%. The results reported in the following Table II were obtained:

TABLE II

| Storage period in days | Conductivity in S |
|---|---|
| 1 | $3.6 \times 10^{-8}$ |
| 2 | $4.7 \times 10^{-9}$ |
| 6 | $4.4 \times 10^{-9}$ |
| 8 | $1.6 \times 10^{-9}$ |
| 16 | $1.5 \times 10^{-9}$ |

It was determined that the conductivity slowly changed beginning with the second day.

By way of comparison, an electroconductive film was prepared under the same conditions, but starting with a styrene/butadiene copolymer not modified with 3-octadecyloxycarbonyl-4-methylpyrrole. This film exhibited a surface conductivity of $7 \times 10^{-10}$ S. The change in its conductivity was monitored under the same conditions indicated above. The results obtained are reported in the Table III below:

TABLE III

| Storage period in days | Conductivity in S |
|---|---|
| 1 | $7 \times 10^{-10}$ |
| 2 | $2 \times 10^{-10}$ |
| 6 | $1 \times 10^{-11}$ |
| 8 | $5 \times 10^{-12}$ |
| 16 | $2 \times 10^{-12}$ |

It was determined that the surface conductivity of the conductive films obtained from the unmodified styrene/butadiene copolymer decreased more rapidly than that of the conductive polymers according to the invention.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A polymeric composition of matter which comprises at least one polymer support substrate (A) and at least one amphiphilic heterocyclic monomer (B) containing two conjugated sites of ethylenic unsaturation and at least one substituent having an amphiphilicity-imparting number of carbon atoms.

2. The polymeric composition as defined by claim 1, said at least one amphiphilic heterocyclic monomer (B) being physically incorporated into a surface layer of said at least one convertible polymer (A).

3. The polymeric composition as defined by claim 2, comprising particulates of said at least one convertible polymer support substrate (A), with hydrophobic ends of said at least one amphiphilic heterocyclic monomer (B) being intimately physically entangled with the polymer chains thereof.

4. The polymeric composition as defined by claim 1, said at least one amphiphilic heterocyclic monomer (B) having the formula (I):

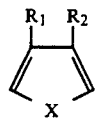

in which $R_1$ and $R_2$, which may be identical or different, are each a linear or branched alkyl, aryl, alkylaryl, arylalkyl, hydroxycarbonyl, alkoxycarbonyl or amide radical; X is an oxygen or sulfur atom or the divalent radical

wherein $R_3$ is a hydrogen atom or an alkyl, aryl, alkylaryl or arylalkyl radical; at least one of the substituents $R_1$, $R_2$ and $R_3$ having an amphiphilicity-imparting number of carbon atoms.

5. The polymeric composition as defined by claim 4, wherein formula (I), X is nitrogen.

6. The polymeric composition as defined by claim 5, said at least one amphiphilic heterocyclic monomer (B) comprising 3-octadecyloxycarbonyl-4-methylpyrrole.

7. The polymeric composition as defined by claim 4, said at least one polymer comprising a thermoplastic polymer.

8. The polymeric composition as defined by claim 7, said thermoplastic polymer comprising an α-olefin (co)polymer, a conjugated diolefin (co)polymer, a styrene or α-methyl styrene (co)polymer, a vinyl ester (co)polymer, an ethylene/vinyl acetate copolymer or hydrolysate thereof, an acrylic (co)polymer or (co)polymer of an anhydride or ester thereof, or a (co)polymer of an ethylenically unsaturated halide.

9. The polymeric composition as defined by claim 8, said thermoplastic polymer comprising a styrene/butadiene/maleic acid copolymer.

10. The polymeric composition as defined by claim 7, comprising a stable dispersion of particulates thereof in water or in a hydroorganic medium.

11. The polymeric composition as defined by claim 10, said stable dispersion comprising a latex.

12. The polymeric composition as defined by claim 7, said thermoplastic polymer comprising anionic recurring structural units.

13. The polymeric composition as defined by claim 4, wherein the amount of said at least one amphiphilic heterocyclic monomer (B) ranges from 0.1% to 20% by weight of said at least one polymer (A).

14. The polymeric composition as defined by claim 13, wherein the amount of said at least one amphiphilic heterocyclic monomer (B) ranges from 0.2% to 5% by weight of said at least one polymer (A).

15. The polymeric composition as defined by claim 4, wherein at least one of the substituents $R_1$, $R_2$ or $R_3$ has at least 10 carbon atoms.

16. An electroconductive polymeric composition of matter which comprises at least one polymer support substrate (A) and at least one electroconductive polymerizate (C) having units derived from at least one amphiphilic heterocyclic monomer (B) containing two conjugated sites of ethylenic unsaturation and at least one substituent having an amphiphilicity-imparting number of carbon atoms.

17. The electroconductive polymeric composition of matter as defined by claim 16, said at least one amphiphilic heterocyclic monomer (B) having the formula (I):

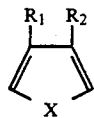

in which $R_1$ and $R_2$, which may be identical or different, are each a linear or branched alkyl, aryl, alkylaryl, arylalkyl, hydroxycarbonyl, alkoxycarbonyl or amide radical; X is an oxygen or sulfur atom or the divalent radical

wherein $R_3$ is a hydrogen atom or an alkyl, aryl, alkylaryl or arylalkyl radical; at least one of the substituents $R_1$, $R_2$ and $R_3$ having an amphiphilicity-imparting number of carbon atoms.

18. The polymeric composition as defined by claim 17, wherein at least one of the substituents $R_1$, $R_2$ or $R_3$ has at least 10 carbon atoms.

19. The electroconductive polymeric composition of matter as defined by claim 29, wherein said at least one electroconductive polymerizate (C) is derived from a heterocyclic monomer having the formula (II)L

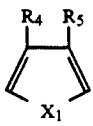

in which $R_4$ and $R_5$, which may be identical or different, are each a hydrogen atom or a radical incapable of imparting amphiphilicity to said at least one polymerizate (C); $X_1$ is an oxygen atom, a sulfur atom or the divalent radical

wherein $R_6$ is a hydrogen atom or a radical which is identical to or different than $R_4$ and $R_5$ and incapable of imparting amphiphilicity to said at least one polymerizate (C).

20. The electroconductive polymeric composition as defined by claim 21, said at least one polymer (A) comprising a thermoplastic polymer.

21. The electroconductive polymeric composition as defined by claim 16, said at least one electroconductive polymerizate (C) being physically anchored to a surface layer of said at least one polymer (A).

22. The electroconductive polymeric composition as defined by claim 21, said at least one polymer (A) comprising a thermoplastic polymer.

23. The electroconductive polymeric composition as defined by claim 21, comprising particulates of said at least one polymer (A) coated with said at least one electroconductive polymerizate (C).

24. The electroconductive polymeric composition as defined by claim 23, comprising a stable aqueous or hydroorganic dispersion.

25. The electroconductive polymeric composition as defined by claim 21, wherein the amount of said at least one amphiphilic heterocyclic monomer polymerized ranges from 1% to 50% by weight of said at least one polymer (A).

* * * * *